United States Patent
Iyengar et al.

(10) Patent No.: US 7,046,300 B2
(45) Date of Patent: May 16, 2006

(54) ASSESSING CONSISTENCY BETWEEN FACIAL MOTION AND SPEECH SIGNALS IN VIDEO

(75) Inventors: Giridharan Iyengar, Mahopac, NY (US); Chalapathy V. Neti, Yorktown Heights, NY (US); Harriet J. Nock, Elmsford, NY (US)

(73) Assignee: International Business Machines Corporation, Armonk, NY (US)

( * ) Notice: Subject to any disclaimer, the term of this patent is extended or adjusted under 35 U.S.C. 154(b) by 546 days.

(21) Appl. No.: 10/307,181

(22) Filed: Nov. 29, 2002

(65) Prior Publication Data

US 2004/0107103 A1    Jun. 3, 2004

(51) Int. Cl.
*H04N 9/475* (2006.01)
(52) U.S. Cl. .................. 348/515; 348/512; 715/500.1; 382/190
(58) Field of Classification Search ................ 348/512, 348/515, 518, 700; 382/100, 190, 228, 207–209; 704/246, 231, 273; 715/500.1; H04N 9/475
See application file for complete search history.

(56) References Cited

U.S. PATENT DOCUMENTS 5,387,943 A * 2/1995 Silver .......................... 348/512
5,572,261 A * 11/1996 Cooper ........................ 348/512
6,219,640 B1 * 4/2001 Basu et al. ................... 704/246

OTHER PUBLICATIONS

L. Cutler et al., "Look Who's Talking: Speaker Detection Using Video and Audio Correlation", IEEE Int'l Conf. on Multimedia and Expo 2000, New York, 2000.
J.W. Fisher et al., Learning Joint Statistical Models for "Audio-Visual Fusion and Segregation", Proc. NIPS (Annual Conf. on Neural Info. Processing Systems), 2001.
M. Slaney et al., "FaceSync: A Linear Operator for Measuring Synchronization of Video Facial Images and Audio Tracks", Proc. NIPS, 2000.
J. Hershey et al., "Audio-Vision: Using Audio-Visual Synchrony to Locate Sounds", Proc. NIPS, 1999.
G. Potamianos et al., "Hierarchical Discriminant Features for Audio-Visual LVCSR", Proc. of Int'l Conf. on Acoustics, Speech, and Signal Processing, Salt Lake City, 2001.
S. Chen et al., "Speaker, Environment and Channel Change Detection and Clustering via the Bayesian Information Criterion", Proc. DARPA (Defense Advanced Research Projects Agency), Broadcast News Transcription & Understanding Workshop, 1998.

* cited by examiner

*Primary Examiner*—Michael H. Lee
(74) *Attorney, Agent, or Firm*—Ference & Associates

(57) ABSTRACT

The use of multiple complementary classes of measure to assess face and speech consistency in video. In an exemplary embodiment, both synchrony measures and plausibility measures are employed.

14 Claims, 2 Drawing Sheets

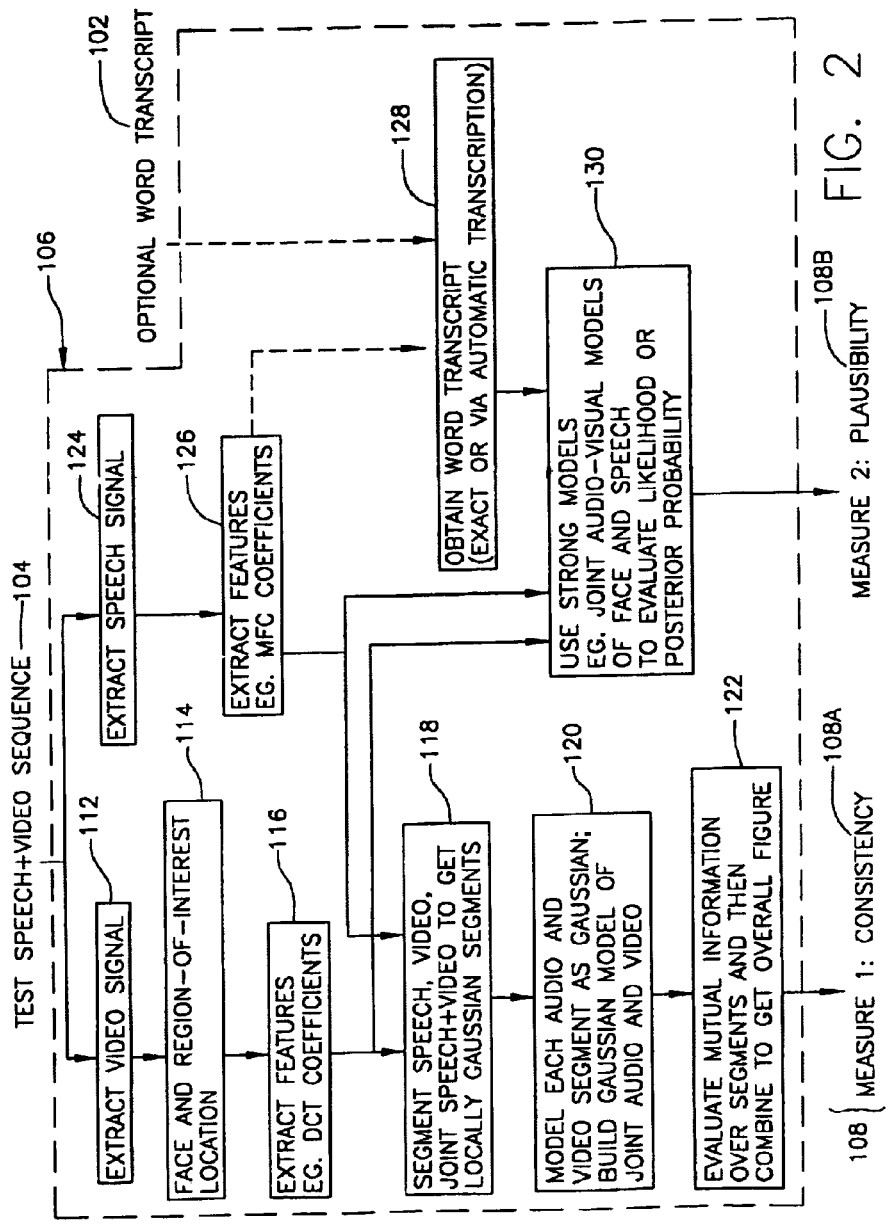

ASSESSING CONSISTENCY BETWEEN FACIAL MOTION AND SPEECH SIGNALS IN VIDEO

FIELD OF THE INVENTION

The present invention relates generally to arrangements and methods for assessing consistency between facial motion and speech signals in video.

BACKGROUND OF THE INVENTION

Historically, it has been problematic to assess consistency (or any lack thereof) between facial motion or expression and speech signals in video. It has long been desirable to provide such assessment with a view to achieving objectives such as (but by no means limited to) the following objectives: the detection of "monologue" in digital video (defined as a talking face on-screen with corresponding speech being present in the soundtrack); detailed evaluation of the quality of post-production movie soundtrack editing and dubbing; detailed evaluation of the quality of lip-synchronization when developing animated characters; providing a mechanism for detecting speakers in a meeting transcription scenario with multiple cameras; providing a mechanism for detecting when a computer user is speaking to the screen for audio-visual speech recognition; and a supplementary measure for verifying that the speech input to an voice-and-face-based biometrics system corresponds to the face on the video input.

Conventional efforts involving synchrony-based solutions include: J. Hershey et al., "Using Audio-Visual Synchrony to Locate Sounds," Proc. NIPS 1999; M. Slaney et al., "FaceSync: A Linear Operator for Measuring Synchronization of Video Facial Images and Audio Tracks", Proc. NIPS 2001; and J. W. Fisher III, et al., "Learning Joint Statistical Models for Audio-Visual Fusion and Synchronization", Proc. NIPS (Annual Conference on Neural Information Processing Systems) 2001. These efforts particularly involve the use of measures based on correlation or covariance under very simple model assumptions. However, these schemes are very limited due to, e.g., applying high scores to the consistent use of facial movements with audio, but without considering the plausibility of those movements either in isolation or as a temporal sequence.

In R. Cutler et al., "Look Who's Talking: Speaker Detection using Video and Audio Correlation", Proc. ICME (International Conference on Multimedia and Expo) 2000, there is contemplated the incorporation of limited knowledge of temporal evolution of audio and lip sequences, which is a crude measure of plausibility. Slaney et al., supra, also suggests the use of a synthesis-based, generative approach in which the speech signal is used to generate a "typical" facial movement and the error between movements of this "typical" face and the face of interest is evaluated. However, these purely strong-model-based schemes will tend to give low scores to certain types of noisy data even when consistency exists.

In view of the foregoing, a need has been recognized in connection with improving upon the shortcomings and disadvantages presented by conventional efforts towards assessing consistency between facial motion and speech signals in video.

SUMMARY OF THE INVENTION

In accordance with at least one presently preferred embodiment of the present invention, there is broadly contemplated the use of multiple complementary classes of measure to assess face and speech consistency in video. In one embodiment of the present invention, both synchrony measures and plausibility measures are employed.

In summary, one aspect of the present invention provides apparatus for determining consistency between facial movements and at least one speech signal associated with video, the apparatus comprising: an arrangement for extracting a video signal from a video input; an arrangement for discerning facial movements in the video signal; an arrangement for obtaining at least one speech signal associated with the video input; an arrangement for producing a synchrony measure which measures consistency between the facial movements discerned and the at least one speech signal obtained; and an arrangement for producing a plausibility measure which measures consistency between the facial movements discerned at the at least one speech signal obtained.

Another aspect of the present invention provides a method of determining consistency between facial movements and at least one speech signal associated with video, the method comprising the steps of: extracting a video signal from a video input; discerning facial movements in the video signal; obtaining at least one speech signal associated with the video input; producing a synchrony measure which measures consistency between the facial movements discerned and the at least one speech signal obtained; and producing a plausibility measure which measures consistency between the facial movements discerned at the at least one speech signal obtained.

Furthermore, an additional aspect of the invention provides a program storage device readable by machine, tangibly embodying a program of instructions executable by the machine to perform method steps determining consistency between facial movements and at least one speech signal associated with video, the method comprising the steps of: extracting a video signal from a video input; discerning facial movements in the video signal; obtaining at least one speech signal associated with the video input; producing a synchrony measure which measures consistency between the facial movements discerned and the at least one speech signal obtained; and producing a plausibility measure which measures consistency between the facial movements discerned at the at least one speech signal obtained.

For a better understanding of the present invention, together with other and further features and advantages thereof, reference is made to the following description, taken in conjunction with the accompanying drawings, and the scope of the invention will be pointed out in the appended claims.

BRIEF DESCRIPTION OF THE DRAWINGS

FIG. 2 is a more particular flow diagram of a process involving the use of consistency and plausibility measures.

DESCRIPTION OF THE PREFERRED EMBODIMENTS

Figure 1:
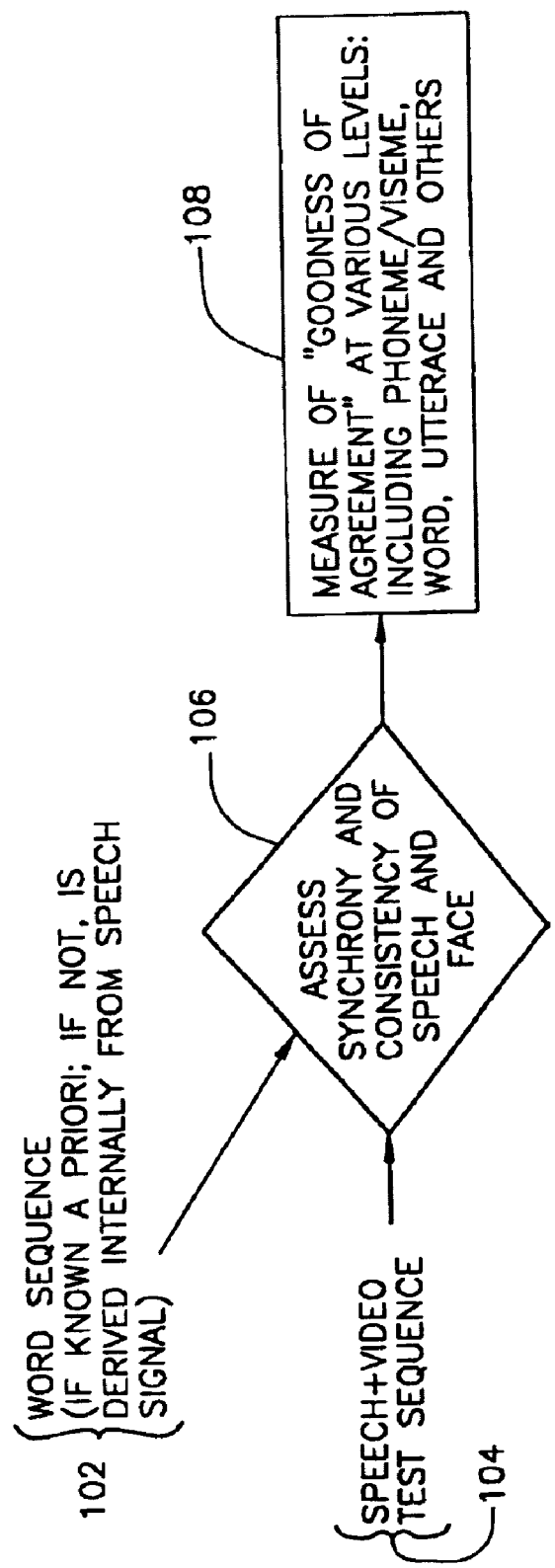
FIG. 1 is a general flow diagram of a process involving the use of consistency and plausibility measures.

As stated above, in accordance with at least one presently preferred embodiment of the present invention, there is broadly contemplated the use of multiple complementary classes of measure to assess face and speech consistency in video, quite in contrast with conventional efforts where only one class of measure was employed.

Broadly contemplated in accordance with at least one embodiment of the present invention is the simultaneous use of synchrony measures and plausibility measures, as described in detail herebelow.

As shown generally in FIG. 1, a word sequence 102 and speech and video test sequence 104 may preferably be input into an arrangement whereby (at 106) the synchrony and consistency of the speech signal and facial movements are assessed. (A discrete word sequence at 102 is actually optional and is only input per se if known a priori. Otherwise, the word sequence may actually be derived internally from the speech signal from 104.) In accordance with a preferred embodiment of the present invention, both consistency and plausibility measures are utilized at this stage. The output, at 108, will then be measures of "goodness of agreement" at various levels, including the phoneme/viseme level, word level, utterance level and others.

Herebelow, reference will now also be made to FIG. 2, which illustrates the items of FIG. 1 in generally more detail, and in so doing also illustrates a number of sub-items. It will be noted in particular that stage 106, as illustrated in FIG. 2, encompasses quite a number of such sub-items in accordance with the illustrated embodiment.

Synchrony (or consistency) measures (hereinafter also referred to as measure[s] "a") generally involve weak model-based measures such as correlation or mutual information between face and speech (e.g., as described in Hershey et al. and Slaney et al., supra). Generally, plausibility measures (hereinafter also referred to as measure[s] "b") represent strong model-based measures which evaluate the plausibility of the sequence of joint speech and face movements.

It has been recognized that systems which evaluate consistency using only one of the two aforementioned types of measures (a) or (b) will fail in certain application scenarios, as discussed herebelow. It has now been found, surprisingly, that a primary advantage in systems using measures of both types (a) and (b) is that systems can be made more robust as a result. In addition, such use of multiple consistency measures will tend to provide additional flexibility, as needed, in certain applications; for example, a crude synchrony measure may be adequate for the quality assessment of rough first-pass animation or dubbing, whereas stronger model-based measures reported at the phoneme, word or utterance level may well tend to provide more refined feedback.

Though measures (a) and (b) can be implemented in a variety of ways, a preferred embodiment is described in detail herebelow.

For both measures (a) and (b), after a speech signal (at 124) and video signal (at 112) are extracted from the original test speech and video input 104, evaluation begins with speech detection and face detection. Face detection may incorporate region-of-interest extraction (114), isolating lip and jaw regions. This is followed by the conversion of speech and face region-of-interest into feature vectors, such as, respectively, Mel-frequency Cepstral (MFC) Coefficients (at 126) and Discrete Cosine Transform (DCT) Coefficients (at 116). (Details relating to a manner of carrying out these steps can be found in G. Potamianos, J. Luettin and C. Neti, "Hierarchical discriminant features for audio-visual LVCSR", Vol. 1, Proceedings International Conference on Acoustics, Speech and Signal Processing, Salt Lake City, 2001.)

In employing a synchrony measure (a), a mutual-information-based measure may preferably assesses synchrony between face and speech movements over short segments.

A general segmentation step is indicated at 118, with input from both feature extractions (116, 126). Though any of a number of methods are conceivable, a BIC-based (Bayesian Information Criterion-based) segmentation scheme may preferably be used here to segment the individual audio and video signals and the joint audio-visual signal into locally Gaussian segments. A particularly suitable method in this regards is to be found in S. S. Chen, et al., "Speaker, Environment and Channel Change Detection and Clustering via the Bayesian Information Criterion", Proc. DARPA (Defense Advanced Research Projects Agency) Broadcast News Transcription & Understanding Workshop 1998.

Each such segment (whether audio, video or joint audio-video) is then preferably modeled by a multivariate Gaussian (120). (For background information, see, for example, John A Rice, *Mathematical Statistics and Data Analysis*, 1994.) These Gaussian distributions are then preferably used to derive per-segment empirical estimates of mutual information between speech and face movement (122). If necessary, an utterance-level measure of agreement can be derived using some function of the per-segment empirical estimates of mutual information; simple examples of such functions include an average, or the minimum, or the maximum but many other possibilities exist. In a presently preferred embodiment of the present invention, one may preferably: (1) for each segment, calculate the ratio between the mutual information value of the M×M region having the highest mutual information (where M is a parameter which can be tuned to reflect the average size of a face in the data set under consideration) and the average mutual information value over the full image; and (2) calculate the average of the per-segment averages from (1) to obtain an overall per-utterance score.

On the other hand, in employing a plausibility measure (b), there are preferably employed (at 130) joint statistical models of facial motion and speech signals (for example, those used in speaker-dependent or speaker-independent audio-visual speech recognition systems). Input is preferably derived from both feature extractions (116, 126) as well as from a word transcript (128). A primary advantage of an approach using joint statistical models is that these models represent "typical" face and lip movements and their relationship with audio with reasonable accuracy, both within and across speakers, and this enables detailed feedback about the quality of agreement between the face and speech. The joint statistical models are used to assess plausibility of face and speech relationship.

Preferably, a hypothesized model sequence (at the level of words or some other unit) is derived (at 128) from knowledge of the words uttered, either directly from a script 102 if available (e.g. for animation or dubbing) or by automatic transcription of the speech signal (i.e., from input from feature extraction 126). Then, the likelihood or posterior probability of the joint audio and video feature sequence given the word sequence is evaluated (at 130) using the joint statistical models.

It is to be understood that the present invention, in accordance with at least one presently preferred embodiment, includes an arrangement for extracting a video signal from a video input, an arrangement for discerning facial movements in the video signal, an arrangement for obtaining at least one speech signal associated with the video input, an arrangement for producing a synchrony measure which measures consistency between the facial movements discerned and the at least one speech signal obtained, and an arrangement for producing a plausibility measure which measures consistency between the facial movements discerned at the at least one speech signal obtained. Together, these elements may be implemented on at least one general-purpose computer running suitable software programs. These may also be implemented on at least one Integrated Circuit or part of at least one Integrated Circuit. Thus, it is to be understood that the invention may be implemented in hardware, software, or a combination of both.

If not otherwise stated herein, it is to be assumed that all patents, patent applications, patent publications and other publications (including web-based publications) mentioned and cited herein are hereby fully incorporated by reference herein as if set forth in their entirety herein.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. An apparatus for determining consistency between facial movements and at least one speech signal associated with video, said apparatus comprising:
    an arrangement for extracting a video signal from a video input;
    an arrangement for discerning facial movements in the video signal;
    an arrangement for obtaining at least one speech signal associated with the video input;
    an arrangement for producing a synchrony measure which measures consistency between the facial movements discerned and the at least one speech signal obtained;
    an arrangement for producing a plausibility measure which measures consistency between the facial movements discerned at the at least one speech signal obtained;
    a first feature extractor, associated with the video signal;
    a second feature extractor, associated with the at least one speech signal;
    said first and second feature extractors each being adapted to extract features for use in determining to the synchrony and plausibility measures;
    wherein said arrangement for producing a synchrony measure comprises an arrangement for segmenting the video input based on input from both of said first and second feature extractors;
    wherein said arrangement for producing a synchrony measure further comprises an arrangement for modeling each segment produced by said segmenting arrangement;
    wherein said modeling arrangement is adapted to model each segment via a multivariate Gaussian.

2. An apparatus for determining consistency between facial movements and at least one speech signal associated with video, said apparatus comprising:
    an arrangement for extracting a video signal from a video input;
    an arrangement for discerning facial movements in the video signal;
    an arrangement for obtaining at least one speech signal associated with the video input;
    an arrangement for producing a synchrony measure which measures consistency between the facial movements discerned and the at least one speech signal obtained;
    an arrangement for producing a plausibility measure which measures consistency between the facial movements discerned at the at least one speech signal obtained;
    a first feature extractor, associated with the video signal;
    a second feature extractor, associated with the at least one speech signal;
    said first and second feature extractors each being adapted to extract features for use in determining to the synchrony and plausibility measures;
    wherein said arrangement for producing a synchrony measure comprises an arrangement for segmenting the video input based on input from both of said first and second feature extractors;
    wherein said arrangement for producing a synchrony measure further comprises an arrangement for modeling each segment produced by said segmenting arrangement;
    wherein said arrangement for producing a synchrony measure further comprises an arrangement for accepting input from said modeling arrangement and deriving per-segment empirical estimates of mutual information between facial movements and speech.

3. The apparatus according to claim 2, wherein the features extracted by said first feature extractor comprise DCT coefficients.

4. The apparatus according to claim 2, wherein the features extracted by said second feature extractor comprise MFC coefficients.

5. An apparatus for determining consistency between facial movements and at least one speech signal associated with video, said apparatus comprising:
    an arrangement for extracting a video signal from a video input;
    an arrangement for discerning facial movements in the video signal;
    an arrangement for obtaining at least one speech signal associated with the video input;
    an arrangement for producing a synchrony measure which measures consistency between the facial movements discerned and the at least one speech signal obtained;
    an arrangement for producing a plausibility measure which measures consistency between the facial movements discerned at the at least one speech signal obtained;
    a first feature extractor, associated with the video signal;
    a second feature extractor, associated with the at least one speech signal;
    said first and second feature extractors each being adapted to extract features for use in determining to the synchrony and plausibility measures;
    wherein said arrangement for producing a plausibility measure comprises an arrangement for providing joint statistical models of facial movements and speech, based on input from both of said first and second feature extractors;
    an arrangement for obtaining a word transcript associated with the video input;
    said arrangement for providing joint statistical models being adapted to accept input from said arrangement for obtaining a word transcript.

6. The apparatus according to claim 5, wherein said arrangement for obtaining a word transcript is adapted to obtain a word transcript via at least one of:
  automatically obtaining a word transcript directly from the video input; and
  obtaining a word transcript separately from the video input.

7. A method of determining consistency between facial movements and at least one speech signal associated with video, said method comprising the steps of:
  extracting a video signal from a video input;
  discerning facial movements in the video signal;
  obtaining at least one speech signal associated wit the video input;
  producing a synchrony measure which measures consistency between the facial movements discerned and the at least one speech signal obtained; and
  producing a plausibility measure which measures consistency between the facial movements discerned at the at least one speech signal obtained;
  providing a first feature extractor, associated with the video signal; and
  providing a second feature extractor, associated with the at least one speech signal;
  wherein said first and second feature extractors are each adapted to extract features for use in determining to the synchrony and plausibility measures;
  wherein the features extracted by said first feature extractor comprise DCT coefficients;
  wherein the features extracted by said second feature extractor comprise MFC coefficients;
  wherein said step of producing a synchrony measure comprises segmenting the video input based on input from both of said first and second feature extractors;
  wherein said step of producing a synchrony measure further comprises modeling each segment produced via said segmenting step;
  wherein said modeling step comprises modeling each segment via a multivariate Gaussian.

8. A method of determining consistency between facial movements and at least one speech signal associated with video, said method comprising the steps of:
  extracting a video signal from a video input;
  discerning facial movements in the video signal;
  obtaining at least one speech signal associated with the video input;
  producing a synchrony measure which measures consistency between the facial movements discerned and the at least one speech signal obtained; and
  producing a plausibility measure which measures consistency between the facial movements discerned at the at least one speech signal obtained;
  providing a first feature extractor, associated with the video signal; and
  providing a second feature extractor, associated with the at least one speech signal;
  wherein said first and second feature extractors are each adapted to extract features for use in determining to the synchrony and plausibility measures;
  wherein the features extracted by said first feature extractor comprise DCT coefficients;
  wherein the features extracted by said second feature extractor comprise MFC coefficients;
  wherein said step of producing a synchrony measure comprises segmenting the video input based on input from both of said first and second feature extractors;
  wherein said step of producing a synchrony measure further comprises modeling each segment produced via said segmenting step;
  wherein said step of producing a synchrony measure further comprises accepting input from said modeling arrangement and deriving per-segment empirical estimates of mutual information between facial movements and speech.

9. A method of determining consistency between facial movements and at least one speech signal associated with video, said method comprising the steps of:
  extracting a video signal from a video input;
  discerning facial movements in the video signal;
  obtaining at least one speech signal associated with the video input;
  producing a synchrony measure which measures consistency between the facial movements discerned and the at least one speech signal obtained;
  producing a plausibility measure which measures consistency between the facial movements discerned at the at least one speech signal obtained;
  providing a first feature extractor, associated with the video signal; and
  providing a second feature extractor, associated with the at least one speech signal;
  wherein said first and second feature extractors are each adapted to extract features for use in determining to the synchrony and plausibility measures;
  wherein said step of producing a plausibility measure comprises providing joint statistical models of facial movements and speech, based on input from both of said first and second feature extractors;
  obtaining a word transcript associated with the video input;
  said step of providing joint statistical models comprising accepting input from said arrangement for obtaining a word transcript.

10. The method according to claim 9, wherein said step of obtaining a word transcript comprises obtaining a word transcript via at least one of:
  automatically obtaining a word transcript directly from the video input; and
  obtaining a word transcript separately from the video input.

11. A program storage device readable by machine, tangibly embodying a program of instructions executable by the machine to perform method steps determining consistency between facial movements and at least one speech signal associated with video, said method comprising the steps of:
  extracting a video signal from a video input;
  discerning facial movements in the video signal;
  obtaining at least one speech signal associated with the video input;
  producing a synchrony measure which measures consistency between the facial movements discerned and the at least one speech signal obtained; and producing a plausibility measure which measures consistency between the facial movements discerned at the at least one speech signal obtained;
  providing a first feature extractor, associated with the video signal; and
  providing a second feature extractor, associated with the at least one speech signal;
  wherein said first and second feature extractors are each adapted to extract features for use in determining to the synchrony and plausibility measures;

wherein the features extracted by said first feature extractor comprise DCT coefficients;

wherein the features extracted by said second feature extractor comprise MFC coefficients;

wherein said step of producing a synchrony measure comprises segmenting the video input based on input from both of said first and second feature extractors;

wherein said step of producing a synchrony measure further comprises modeling each segment produced via said segmenting step;

wherein said modeling step comprises modeling each segment via a multivariate Gaussian.

12. A program storage device readable by machine, tangibly embodying a program of instructions executable by the machine to perform method steps determining consistency between facial movements and at least one speech signal associated with video, said method comprising the steps of:

extracting a video signal from a video input;

discerning facial movements in the video signal;

obtaining at least one speech signal associated with the video input;

producing a synchrony measure which measures consistency between the facial movements discerned and the at least one speech signal obtained; and producing a plausibility measure which measures consistency between the facial movements discerned at the at least one speech signal obtained;

providing a first feature extractor, associated with the video signal; and providing a second feature extractor, associated with the at least one speech signal;

wherein said first and second feature extractors are each adapted to extract features for use in determining to the synchrony and plausibility measures;

wherein the features extracted by said first feature extractor comprise DCT coefficients;

wherein the features extracted by said second feature extractor comprise MFC coefficients;

wherein said step of producing a synchrony measure comprises segmenting the video input based on input from both of said first and second feature extractors;

wherein said step of producing a synchrony measure further comprises modeling each segment produced via said segmenting step;

wherein said step of producing a synchrony measure further comprises accepting input from said modeling arrangement and deriving per-segment empirical estimates of mutual information between facial movements and speech.

13. A program storage device readable by machine, tangibly embodying a program of instructions executable by the machine to perform method steps determining consistency between facial movements and at least one speech signal associated with video, said method comprising the steps of:

extracting a video signal from a video input;

discerning facial movements in the video signal;

obtaining at least one speech signal associated with the video input;

producing a synchrony measure which measures consistency between the facial movements discerned and the at least one speech signal obtained;

producing a plausibility measure which measures consistency between the facial movements discerned at the at least one speech signal obtained;

providing a first feature extractor, associated with the video signal; and providing a second feature extractor, associated with the at least one speech signal;

wherein said first and second feature extractors are each adapted to extract features for use in determining to the synchrony and plausibility measures;

wherein said step of producing a plausibility measure comprises providing joint statistical models of facial movements and speech, based on input from both of said first and second feature extractors;

obtaining a word transcript associated with the video input;

said step of providing joint statistical models comprising accepting input from said arrangement for obtaining a word transcript.

14. The program storage device according to claim 13, wherein said step of obtaining a word transcript comprises obtaining a word transcript via at least one of:

automatically obtaining a word transcript directly from the video input; and obtaining a word transcript separately from the video input.

* * * * *

UNITED STATES PATENT AND TRADEMARK OFFICE
CERTIFICATE OF CORRECTION

PATENT NO. : 7,046,300 B2  
APPLICATION NO. : 10/307181  
DATED : May 16, 2006  
INVENTOR(S) : Giridharan Iyengar et al.

Page 1 of 1

It is certified that error appears in the above-identified patent and that said Letters Patent is hereby corrected as shown below:

Column 7, Line 13, "wit" should be --with--

Signed and Sealed this

Third Day of April, 2007

JON W. DUDAS  
*Director of the United States Patent and Trademark Office*